(12) United States Patent
Akiyoshi et al.

(10) Patent No.: US 9,976,608 B2
(45) Date of Patent: *May 22, 2018

(54) ROTATION TRANSMISSION DEVICE

(71) Applicant: NTN CORPORATION, Osaka (JP)

(72) Inventors: Koji Akiyoshi, Shizuoka (JP); Koji Sato, Shizuoka (JP); Naotsugu Kitayama, Shizuoka (JP); Takahide Saito, Shizuoka (JP)

(73) Assignee: NTN CORPORATION, Osaka (JP)

( * ) Notice: Subject to any disclaimer, the term of this patent is extended or adjusted under 35 U.S.C. 154(b) by 29 days.

This patent is subject to a terminal disclaimer.

(21) Appl. No.: 15/024,998

(22) PCT Filed: Sep. 25, 2014

(86) PCT No.: PCT/JP2014/075387
§ 371 (c)(1),
(2) Date: Mar. 25, 2016

(87) PCT Pub. No.: WO2015/046309
PCT Pub. Date: Apr. 2, 2015

(65) Prior Publication Data
US 2016/0238092 A1 Aug. 18, 2016

(30) Foreign Application Priority Data

Sep. 27, 2013 (JP) ................................. 2013-201599

(51) Int. Cl.
*F16D 47/04* (2006.01)
*F16D 21/08* (2006.01)
(Continued)

(52) U.S. Cl.
CPC ............. *F16D 47/04* (2013.01); *F16D 21/08* (2013.01); *F16D 27/118* (2013.01); *F16D 41/067* (2013.01); *F16D 41/088* (2013.01)

(58) Field of Classification Search
None
See application file for complete search history.

(56) References Cited

U.S. PATENT DOCUMENTS 3,414,100 A * 12/1968 Spencer ................ F16D 27/112
192/69.82
9,702,418 B2 * 7/2017 Akiyoshi .............. F16D 41/088
(Continued)

FOREIGN PATENT DOCUMENTS

EP  1 338 816   8/2003
EP  2 835 550   2/2015
(Continued)

OTHER PUBLICATIONS

Extended European Search Report dated Jan. 3, 2017 in corresponding European Application No. 14849031.1.
(Continued)

*Primary Examiner* — Jacob S. Scott
*Assistant Examiner* — Timothy Hannon
(74) *Attorney, Agent, or Firm* — Wenderoth, Lind & Ponack, L.L.P.

(57) ABSTRACT

When a control retainer and a rotary retainer rotate relative to each other, a plurality of pairs of rollers received in respective pockets are pushed by pillars so as to move to their disengaged position. An anti-rotation arrangement is provided between an outer ring and the control retainer. The anti-rotation arrangement prevents the control retainer from rotating relative to the outer ring when the rollers are engaged, so that that the rollers does not move to their neutral position. This increases reliability. The anti-rotation arrangement includes a plurality of first protrusions formed on the surface of the outer ring, and a plurality of second protrusions formed on the surface of the control retainer axially opposed to the surface of the outer ring. Heat
(Continued)

treatment is performed to the first and second protrusions so as to increase the hardness thereof.

10 Claims, 9 Drawing Sheets

(51) Int. Cl.
   *F16D 27/118* (2006.01)
   *F16D 41/067* (2006.01)
   *F16D 41/08* (2006.01)

(56) References Cited

U.S. PATENT DOCUMENTS

| | | | |
|---|---|---|---|
| 2002/0134634 A1* | 9/2002 | Ito | B60K 6/387 192/35 |
| 2004/0182670 A1 | 9/2004 | Nojiri et al. | |
| 2010/0314212 A1 | 12/2010 | Akiyoshi et al. | |
| 2013/0299298 A1 | 11/2013 | Akiyoshi et al. | |
| 2015/0075936 A1 | 3/2015 | Akiyoshi et al. | |

FOREIGN PATENT DOCUMENTS

| | | |
|---|---|---|
| JP | 52-154544 | 11/1977 |
| JP | 2008-51244 | 3/2008 |
| JP | 2009-191952 | 8/2009 |
| JP | 2009-293679 | 12/2009 |
| JP | 2009-293761 | 12/2009 |
| JP | 2013-92191 | 5/2013 |
| WO | 2012/099244 | 7/2012 |

OTHER PUBLICATIONS

International Search Report dated Dec. 22, 2014 in corresponding International Application No. PCT/JP2014/075387 (with English translation).

Office Action dated Nov. 1, 2017 in Chinese Application No. 201480053352.1, with partial English translation.

* cited by examiner

ROTATION TRANSMISSION DEVICE

TECHNICAL FIELD

The present invention relates to a rotation transmission device capable of selectively performing and stopping the transmission of rotation.

BACKGROUND ART

As rotation transmission devices configured to selectively perform and stop the transmission of the rotation of a driving shaft to a driven shaft, rotation transmission devices are known which include a two-way clutch, and an electromagnetic clutch configured to selectively engage and disengage the two-way clutch.

Japanese Unexamined Patent Application Publication No. 2009-293679 discloses a rotation transmission device including an outer ring having a cylindrical surface on its inner periphery, an inner ring having cam surfaces on its outer periphery, and provided inside of the outer ring, a control retainer and a rotary retainer provided between the outer ring and the inner ring such that pillars of the control retainer circumferentially alternate with pillars of the rotary retainer, opposed pairs of rollers received in pockets defined between adjacent ones of the pillars of the control retainer and the pillars of the rotary retainer, and elastic members received between the respective opposed pairs of rollers. The opposed pairs of rollers are biased away from each other by the corresponding elastic member so as to be kept at a standby position at which the rollers engage with the cylindrical surface of the outer ring and the corresponding cam surface of the inner ring. When the inner ring rotates in one direction, one of each opposed pair of rollers engage with the cylindrical surface and the corresponding cam surface so as to transmit the rotation of the inner ring to the outer ring.

The rotation transmission device of Japanese Publication No. 2009-293679 further includes an input shaft connected to the inner ring, and an electromagnetic clutch having an electromagnetic coil, and provided on the input shaft. When the electromagnetic coil of the electromagnetic clutch is energized, the control retainer axially moves. As a result thereof, due to a torque cam provided between the opposed surfaces of a flange of the control retainer and a flange of the rotary retainer, the control retainer and the rotary retainer rotate relative to each other in the direction in which the circumferential widths of the respective pockets decrease, so that the pairs of rollers are moved to their disengaged position by the pillars of the control retainer and the respective pillars of the rotary retainer, thereby stopping the transmission of the rotation of the inner ring to the outer ring.

In the above rotation transmission device, when the electromagnetic coil of the electromagnetic clutch is de-energized, due to the pressing force of the elastic members received between the respective opposed pairs of rollers, the control retainer and the rotary retainer rotate relative to each other in the direction in which the circumferential widths of the respective pockets increase, thereby moving the respective opposed pairs of rollers to the standby position at which the pairs of rollers abut the cylindrical surface and the respective cam surfaces. Therefore, when the inner ring rotates, the pairs of rollers instantly engage with the cylindrical surface and the respective cam surfaces, namely, the rollers scarcely move in the rotational direction, and can respond quickly.

In the rotation transmission device disclosed in Japanese Publication No. 2009-293679, with the electromagnetic coil of the electromagnetic clutch is de-energized, the opposed pairs of rollers move toward the standby position at which the rollers abut the cylindrical surface of the outer ring and the respective cam surfaces of the inner ring. When the outer ring and the inner ring rotate relative to each other, the rollers engage. With the rollers moved at the standby position or engaged, if disturbance such as vibration is applied to the rotation transmission device, the outer ring and the control retainer may rotate relative to each other due to moment of inertia. If the outer ring and the control retainer rotate relative to each other, one of each pair of rollers moves to its neutral position, so that torque cannot be transmitted between the outer ring and the inner ring. Therefore, there are some points which need to be improved so as to enable the rotation transmission device to operate with high reliability.

It is an object of the present invention to prevent rollers from moving to their neutral position due to disturbance with a two-way clutch engaged so as to enable a rotation transmission device to operate with high reliability.

SUMMARY OF THE INVENTION

In order to achieve the above object, the present invention provides a rotation transmission device comprising: an input shaft; an output shaft arranged coaxially with the input shaft; a two-way clutch configured to selectively perform and stop transmission of torque between the input shaft and the output shaft; and an electromagnetic clutch configured to selectively engage and disengage the two-way clutch. The two-way clutch comprises: an outer ring provided at an end portion of the output shaft; an inner ring provided at an end portion of the input shaft; a control retainer having first pillars; and a rotary retainer having second pillars. The first and second pillars are arranged between an inner periphery of the outer ring and an outer periphery of the inner ring such that the first pillars circumferentially alternate with the second pillars. Pockets are defined between adjacent first and second pillars. The two-way clutch further comprises: a plurality of pairs of engaging elements, each pair of the engaging elements being received in each of the pockets so as to be engageable with the inner periphery of the outer ring and the outer periphery of the inner ring; and elastic members each biasing each pair of engaging elements in a direction away from each other. The electromagnetic clutch comprises: an armature coupled to the control retainer; a rotor axially opposed to the armature; and an electromagnet axially opposed to the rotor, and configured to attract the armature such that the armature abuts the rotor when the electromagnet is energized. The rotation transmission device is configured such that when the electromagnet is energized, the control retainer, together with the armature, is moved in an axial direction toward the rotor. The rotation transmission device further comprises a motion converting mechanism configured such that when the control retainer is moved in the axial direction, the motion converting mechanism converts the axial movement of the control retainer to a relative rotary motion between the control retainer and the rotary retainer in a direction in which circumferential widths of the respective pockets decrease, thereby disengaging the pairs of engaging elements. The rotation transmission device further comprises an anti-rotation arrangement provided between the outer ring and the control retainer and configured to prevent the outer ring and the control retainer from rotating relative to each other with the two-way clutch engaged due to de-energizing of the electromagnet. The anti-rotation arrangement comprises: a plurality of first protrusions formed on a surface of the outer ring so as to be circumferentially equidistantly spaced apart from each other; and a plurality of second protrusions formed on a surface of the control retainer axially opposed to the surface of the outer ring so as to be circumferentially equidistantly spaced apart from each other. The first protrusions of the outer ring are different in number from the second protrusions of the control retainer such that at least one of the second protrusions can circumferentially engage with at least one of the first protrusions, and wherein heat treatment is performed to the first protrusions of the outer ring and the second protrusions of the control retainer.

As described above, by providing the anti-rotation arrangement for preventing the outer ring and the control retainer from rotating relative to each other with the flange of the control retainer kept in contact with the open end surface of the outer ring due to the de-energizing of an electromagnetic coil of the electromagnetic clutch, it is possible to prevent the control retainer from rotating relative to the outer ring due to disturbance with the engaging elements moved to the standby position at which the engaging elements abut the inner periphery of the outer ring and the outer periphery of the inner ring or with the engaging elements engaged with the inner periphery of the outer ring and the outer periphery of the inner ring.

Due to this, the engaging elements never move to their neutral position. As a result thereof, torque can be reliably transmitted between the inner ring and the outer ring through the engaging elements, thus enabling the rotation transmission device to operate with high reliability.

When the electromagnetic coil is de-energized, due to the elastic force of the elastic members, the control retainer rotate in the direction in which the circumferential widths of the respective pockets increase, so that the second protrusions of the control retainer abut hard against the first protrusions of the outer ring. At this time, since heat treatment is performed to the first and second protrusions so as to increase the hardness thereof, the first and second protrusions are never damaged. Therefore, the rotation transmission device can operate with high reliability.

As the heat treatment performed to the first and second protrusions, carburizing and quenching, laser quenching or high frequency quenching can be used. As for the control retainer, it is preferable that heat treatment is performed to only the second protrusions of the control retainer. The reason is because if heat treatment is performed to the whole of the control retainer so as to increase the hardness of the whole thereof, the toughness of the control retainer decreases, so that when the engaging elements are pressed to move to their neutral position, since a stress tends to concentrate on the root of each first pillar, it is necessary to take the design of each first pillar into consideration.

In the rotation transmission device according to the present invention, the motion converting mechanism, configured to convert the axial movement of the control retainer to the relative rotary motion between the control retainer and the rotary retainer, comprises a torque cam including: cam grooves each formed in each of opposed surfaces of a flange of the control retainer and a flange of the rotary retainer such that each of the cam grooves is deepest at a circumferential center of the cam groove, and such that a depth of each of the cam grooves gradually decreases toward respective circumferential ends of the cam groove; and a ball received between the cam grooves. The torque cam is configured such that when the control retainer axially moves, the torque cam rotates the control retainer and the rotary retainer relative to each other in the direction in which the circumferential widths of the respective pockets decrease.

By providing the torque cam with torque being transmitted through the engaging elements kept in contact with the respective second pillars of the rotary retainer, when the electromagnetic coil is energized, since the rotary retainer are in engagement with the engaging elements through which torque is being transmitted, and thus cannot rotate in the direction in which the circumferential widths of the respective pockets decrease, the control retainer is subjected to a force that tends to move the control retainer toward the rotor while rotating in the direction in which the circumferential widths of the respective pockets decrease, due to the relationship with the torque cam.

At this time, if the inclination angle of the engaging surfaces of the first and second protrusions is larger than the inclination angle of the cam grooves of the torque cam, such engaging surfaces may prevent the rotation of the control retainer, so that the engaging elements may not be able to disengage.

In order to avoid such a situation, if the first protrusions of the outer ring each has a first tapered end surface on a rear side of the first protrusion in a forward direction in which the outer ring rotates, and the second protrusions of the control retainer each has a second tapered end surface formed to engage with one of the first tapered end surfaces, wherein an inclination angle of each of the first and second tapered surfaces relative to an end surface of the outer ring is set to be smaller than an inclination angle of each of the cam grooves of the torque cam relative to the end surface of the outer ring, when the electromagnetic coil is energized, the control retainer is never prevented from rotating in the direction in which the circumferential widths of the respective pockets decrease, thus making it possible to reliably disengage the two-way clutch.

The "forward direction in which the outer ring rotates" described above means the clockwise direction when the open end surface of the outer ring is seen from the front.

Effects of the Invention

In the present invention as described above, by providing the anti-rotation arrangement for preventing the outer ring and the control retainer from rotating relative to each other with the flange of the control retainer kept in contact with the open end surface of the outer ring due to the de-energizing of the electromagnetic coil of the electromagnetic clutch, it is possible to prevent the outer ring and the control retainer from rotating relative to each other with the engaging elements (rollers) moved to the standby position at which the engaging elements (rollers) abut the inner periphery (cylindrical surface) of the outer ring and the outer periphery (cam surfaces) of the inner ring or with the engaging elements (rollers) engaged with the inner periphery (cylindrical surface) of the outer ring and the outer periphery (cam surfaces) of the inner ring. Due to this, the engaging elements (rollers) never move to their neutral position. As a result thereof, torque can be reliably transmitted between the inner ring and the outer ring through the engaging elements (rollers), thus enabling the rotation transmission device to operate with high reliability.

Since heat treatment is performed to the first protrusions of the outer ring and the second protrusions of the control retainer so as to increase the hardness thereof, even when the control retainer rotates in the direction in which the circumferential widths of the respective pockets increase due to the elastic force of the elastic members so that the second protrusions of the control retainer abut hard against the first protrusions of the outer ring, the first and second protrusions are never damaged. Therefore, the rotation transmission device can operate with high reliability.

DETAILED DESCRIPTION OF THE INVENTION

Figure 1:
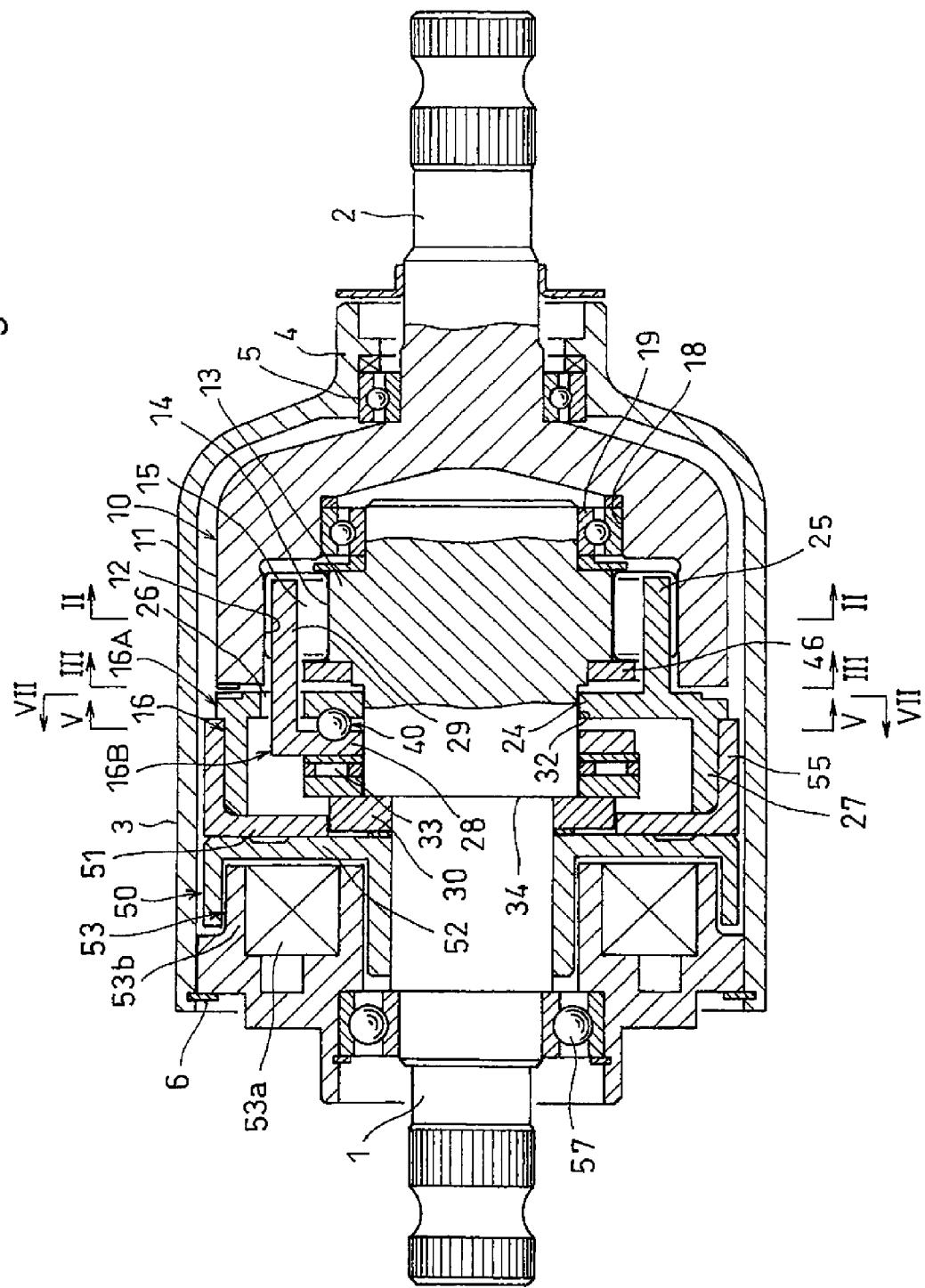
FIG. 1 is a longitudinal sectional view of a rotation transmission device according to an embodiment of the present invention.

The embodiment of the present invention is now described with reference to the drawings. FIG. 1 illustrates a rotation transmission device according to an embodiment of the present invention. As illustrated in FIG. 1, the rotation transmission device includes an input shaft 1, an output shaft 2 arranged coaxially with the input shaft 1, a housing 3 covering the opposed end portions of the input shaft 1 and the output shaft 2, a two-way clutch 10 provided in the housing 3, and configured to selectively perform and stop the transmission of the rotation of the input shaft 1 to the output shaft 2, and an electromagnetic clutch 50 configured to selectively engage and disengage the two-way clutch 10.

The housing 3 has a cylindrical shape, and is formed at one of the two ends thereof with a small diameter bearing tube 4. The output shaft 2 is rotatably supported by a bearing 5 provided in the bearing tube 4.

As illustrated in FIGS. (1), 2(a) and 2(b), the two-way clutch 10 further includes an outer ring 11 provided at the end portion of the output shaft 2 and formed, on the inner periphery of the outer ring 11, with a cylindrical surface 12, an inner ring 13 provided at the end portion of the input shaft 1 and formed, on the outer periphery of the inner ring 13, with a plurality of circumferentially arranged cam surfaces 14, an opposed pair of rollers 15 (engaging elements) and an elastic member 21 that are arranged between each cam surface 14 and the cylindrical surface 12, and a retainer assembly 16 retaining the rollers 15. When the inner ring 13 rotates in one direction, one of each opposed pair of rollers 15 engages with the cylindrical surface 12 and the corresponding cam surface 14, thereby transmitting the rotation of the inner ring 13 to the outer ring 11. When the inner ring 13 rotates in the other direction, the other of each opposed pair of rollers 15 engages with the cylindrical surface 12 and the corresponding cam surface 14, thereby transmitting the rotation of the inner ring 13 to the outer ring 11.

A small diameter recess 18 is formed in the inner surface of the closed end of the outer ring 11. The end portion of the input shaft 1 is rotatably supported by a bearing 19 provided in the recess 18.

The inner ring 13 is integral with the input shaft 1. As illustrated in FIGS. 2(a) and 2(b), the cam surfaces 14, formed on the outer periphery of the inner ring 13, are each constituted by a pair of slope surface portions 14a and 14b sloping in opposite directions to each other. Each of the slope surface portions 14a and 14b defines a wedge-shaped space between the slope surface portion and the cylindrical surface 12 of the outer ring 11, the space narrowing toward the respective circumferential ends of the space. Flat spring supporting surfaces 20 are formed between the respective pairs of slope surface portions 14a and 14b so as to extend in the tangential directions of the inner ring 13. The elastic members 21 are supported by the respective spring supporting surfaces 20.

The elastic members 21 are coil springs arranged between the respective opposed pairs of rollers 15. The rollers 15 in each pair of rollers 15 are biased away from each other by the corresponding elastic member 21 so as to be kept at a standby position at which the pair of rollers 15 engage with the cylindrical surface 12 and the corresponding cam surface 14.

Figure 5:
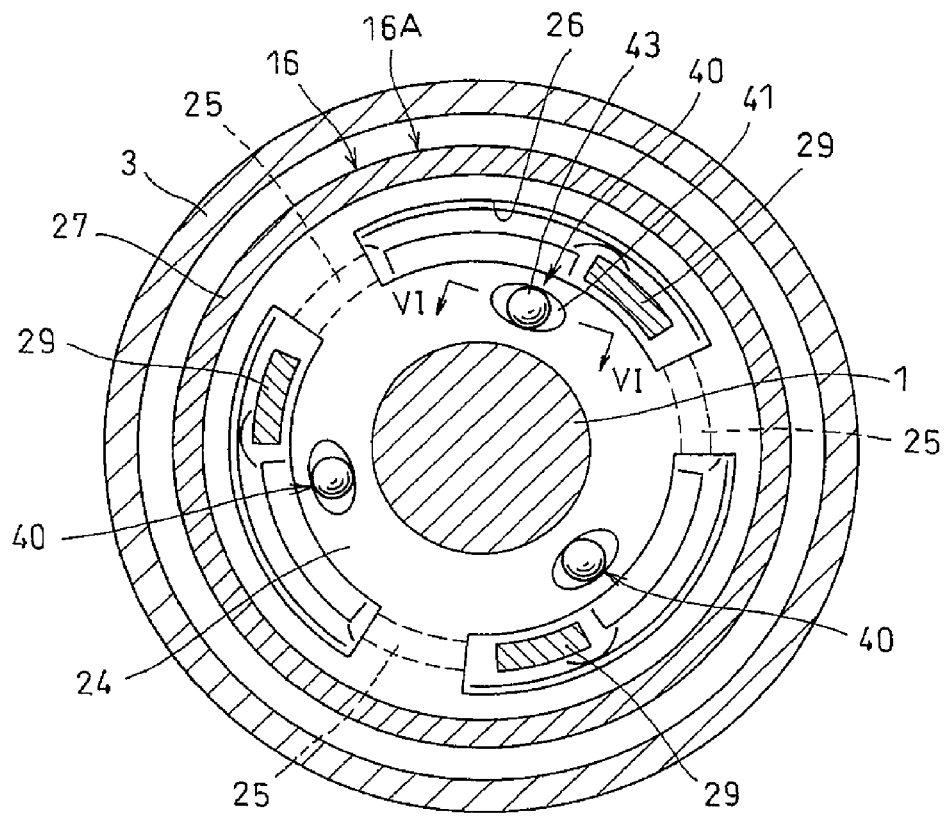
FIG. 5 is a sectional view taken along line V-V of FIG. 1.

The retainer assembly 16 is constituted by a control retainer 16A and a rotary retainer 16B. As illustrated in FIGS. 1 and 5, the control retainer 16A includes an annular flange 24, and first pillars 25 equal in number to the cam surfaces 14 and extending from the outer peripheral portion of one surface of the flange 24, the first pillars 25 being circumferentially equidistantly spaced apart from each other. The annular flange 24 is formed with circular arc-shaped elongated holes 26 between the respective adjacent pairs of first pillars 25. The control retainer 16A further includes a tubular portion 27 extending from the outer periphery of the flange 24 in the direction opposite to the direction in which the first pillars 25 extend.

The rotary retainer 16B includes an annular flange 28, and second pillars 29 equal in number to the cam surfaces 14 and extending from the outer periphery of the flange 28, the second pillars 29 being circumferentially equidistantly spaced apart from each other.

The control retainer 16A and the rotary retainer 16B are combined together by inserting the second pillars 29 of the rotary retainer 16B through the respective elongated holes 26 of the control retainer 16A such that the first pillars 25 circumferentially alternate with the second pillars 29. With the retainers 16A and 16B combined together in this way, the distal end portions of the pillars 25 and 29 are arranged between the outer ring 11 and the inner ring 13, and the flange 24 of the control retainer 16A and the flange 28 of the rotary retainer 16B are arranged between the outer ring 11 and a support ring 30 fitted on the outer periphery of the input shaft 1.

By combining the retainers 16A and 16B together as described above, as illustrated in FIGS. 2(a) and 2(b), pockets 31 are defined between the pillars 25 of the control retainer 16A and the respective pillars 29 of the rotary retainer 16B so as to be radially opposed to the respective cam surfaces 14 of the inner ring 13. One of the opposed pairs of rollers (engaging elements) 15 and one of the elastic members 21 are received in each pocket 31.

Figure 9:
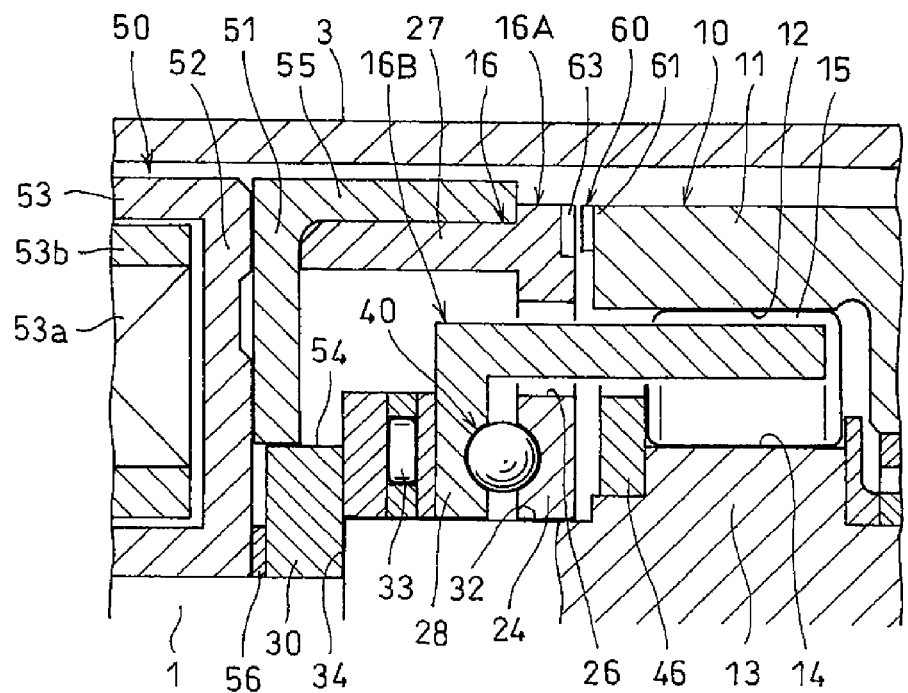
FIG. 9 is a sectional view illustrating the state in which the control retainer is attracted to (in abutment with) the electromagnetic clutch illustrated in FIG. 1.

As illustrated in FIG. 9, the flange 24 of the control retainer 16A and the flange 28 of the rotary retainer 16B are supported by a slide guide surface 32 formed on the outer periphery of the input shaft 1 so as to be slidable along the slide guide surface 32. A thrust bearing 33 is provided between the flange 28 of the rotary retainer 16B and the support ring 30 of the input shaft 1.

As illustrated in FIGS. 5, 6(a), 6(b) and 9, a motion converting mechanism comprising a torque cam 40 is provided between the flange 24 of the control retainer 16A and the flange 28 of the rotary retainer 16B. The torque cam 40 includes opposed pairs of cam grooves 41 and 42 formed in the respective opposed surfaces of the flange 24 of the control retainer 16A and the flange 28 of the rotary retainer 16B. Each of the cam grooves 41 and 42 is deepest at the circumferential center of the groove, and the depth of the groove gradually decreases toward the respective circumferential ends of the groove. The torque cam 40 further includes a ball 43 received between one circumferential end of each came groove 41 and the opposite circumferential end of the corresponding cam groove 42.

Though the cam grooves 41 and 42 are circular arc-shaped in this embodiment, the cam grooves may be V-shaped.

The torque cam 40 is configured such that when the control retainer 16A moves in the axial direction in which the flange 24 of the control retainer 16A approaches the flange 28 of the rotary retainer 16B, as illustrated in FIG. 6(a), the balls 43 roll to move toward the deepest portions of the respective opposed pairs of cam grooves 41 and 42, thereby rotating the control retainer 16A and the rotary retainer 16B relative to each other in the direction in which the circumferential widths of the respective pockets 31 decrease.

Figure 3:
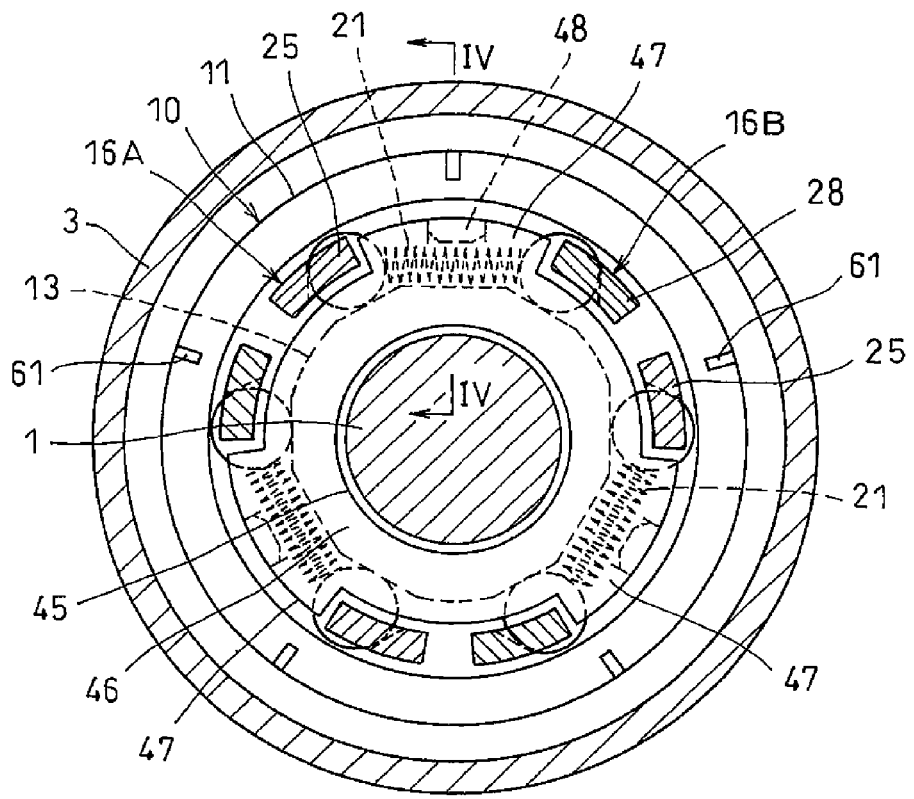
FIG. 3 is a sectional view taken along line III-III of FIG. 1.
Figure 4:
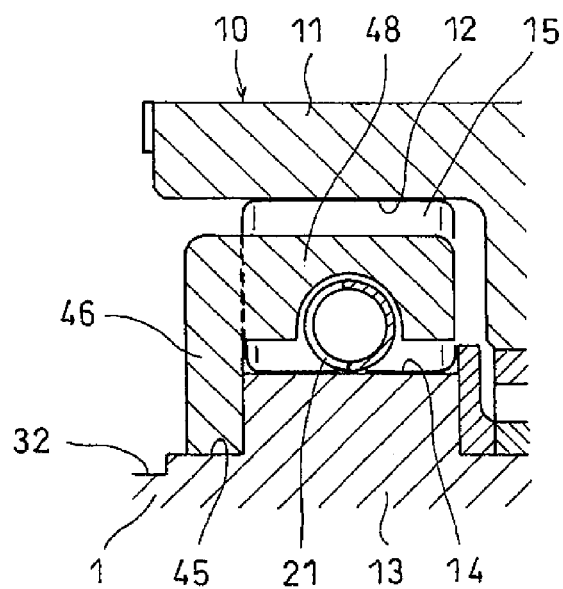
FIG. 4 is a sectional view taken along line IV-IV of FIG. 3.

As illustrated in FIGS. 3 and 4, the inner ring 13 is formed at its other end portion with a cylindrical surface 45 having a diameter larger than that of the slide guide surface 32. An annular holding plate 46 is fitted on the cylindrical surface 45 so as to be fixed to the inner ring 13. The holding plate 46 is formed on its outer peripheral surface with a plurality of anti-rotation pieces 47 arranged in the pockets 31, defined between the pillars 25 of the control retainer 16A and the pillars 29 of the rotary retainer 16B.

When the control retainer 16A and the rotary retainer 16B rotate relative to each other in the direction in which the circumferential widths of the respective pockets 31 decrease, the anti-rotation pieces 47 receive, on the respective side edges thereof, the pillars 25 of the control retainer 16A and the pillars 29 of the rotary retainer 16B, thereby keeping the opposed pairs of rollers 15 in their neutral position.

The holding plate 46 is provided on its outer peripheral portion with spring presser arms 48 extending to overhang the outer diameter sides of the respective elastic members 21. Each spring presser arm 48 prevents the corresponding elastic member 21 from moving/escaping radially outwardly from the space between the opposed pair of rollers 15.

As illustrated in FIG. 1, the electromagnetic clutch 50 includes an armature 51 axially opposed to the end surface of the tubular portion 27 of the control retainer 16A, a rotor 52 axially opposed to the armature 51, and an electromagnet 53 axially opposed to the rotor 52.

As illustrated in FIG. 9, the armature 51 is fitted on the outer periphery of the support ring 30, and rotatably and slidably supported by the support ring 30, and the tubular portion 27 of the control retainer 16A is press-fitted to the inner diameter surface of a coupling tube 55 provided on the outer peripheral portion of the armature 51 so that the control retainer 16A and the armature 51 are fixedly coupled to each other. Due to this coupling, the armature 51 is slidably supported by two surfaces separately arranged in the axial direction, specifically, by the cylindrical outer diameter surface 54 of the support ring 30 and the slide guide surface 32 formed on the outer periphery of the input shaft 1.

The support ring 30 is axially positioned by a step 34 formed on the other axial end of the slide guide surface 32 of the input shaft 1.

The rotor 52 is press-fitted on the input shaft 1, axially positioned by a shim 56 provided between the support ring 30 and the rotor 52, and rotationally fixed to the input shaft 1.

As illustrated in FIG. 1, the electromagnet 53 is constituted by an electromagnetic coil 53a, and a core 53b supporting the electromagnetic coil 53a. The core 53b is fitted in the opening of the housing 3 (which is a stationary member) at its other end, and prevented from separating from the housing 3 by a snap ring 6 attached in the opening of the housing 3. Moreover, the core 53b is fixed to the housing 3, and a bearing 57 provided inside of the core 53b rotatably supports the input shaft 1.

Figure 10:
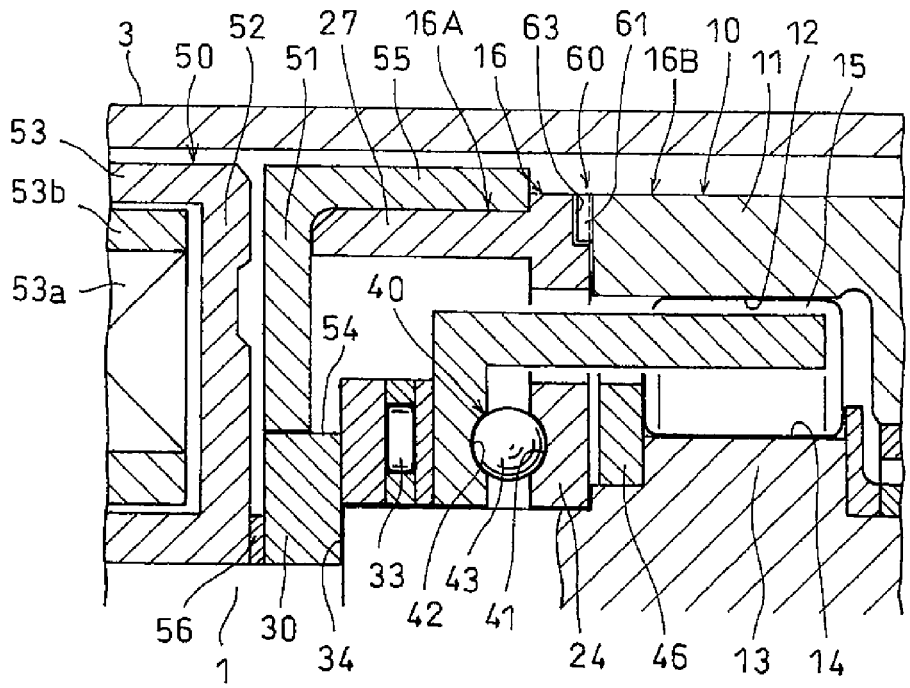
FIG. 10 is a sectional view illustrating the state in which the control retainer is not attracted to (not in abutment with) the electromagnetic clutch illustrated in FIG. 1.

FIG. 10 illustrates the state in which the electromagnetic coil 53a of the electromagnetic clutch 50 is de-energized (the electromagnetic clutch 50 is turned off). In this de-energized state, the flange 24 of the control retainer 16A is in abutment with the open end surface of the outer ring 11 of the two-way clutch 10. An anti-rotation arrangement 60 is provided between the outer ring 11 and the flange 24 of the control retainer 16A so as to prevent the outer ring 11 and the control retainer 16A from rotating relative to each other with the flange 24 in abutment with the outer ring 11.

Figure 7:
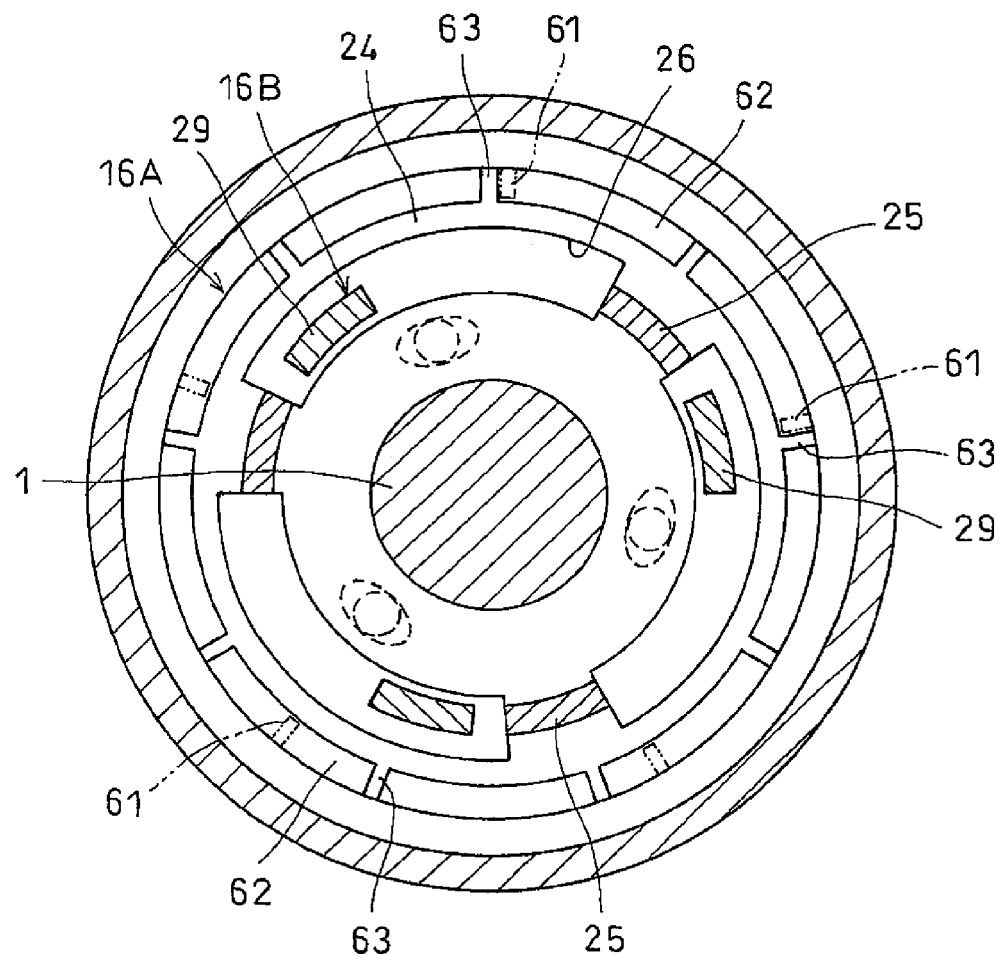
FIG. 7 is a sectional view taken along line VII-VII of FIG. 1.
Figure 8:
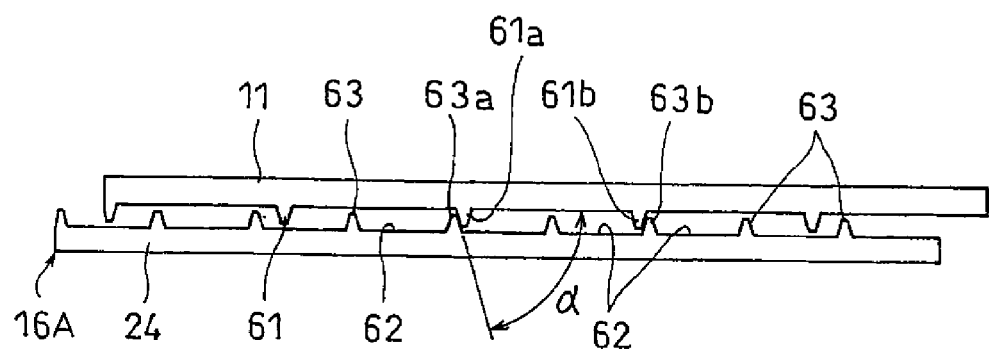
FIG. 8 is a developed view of the rotationally fixed portions of the open end surface of the outer ring and the flange of the control retainer illustrated in FIG. 1.

As illustrated in FIGS. 7 to 9, the anti-rotation arrangement 60 includes a plurality of protrusions 61 (first protrusions 61) formed on the open end surface of the outer ring 11 so as to be circumferentially equidistantly spaced apart from each other, and a plurality of recesses 62 formed in the surface of the flange 24 of the control retainer 16A axially opposed to the outer ring 11 so as to be circumferentially equidistantly spaced apart from each other such that a plurality of protrusions 63 (second protrusions 63) are defined between the respective adjacent pairs of recesses 62. The anti-rotation arrangement 60 prevents the control retainer 16A from rotating relative to the outer ring 11 by engaging two of the protrusions 63 of the control retainer 16A with two of the protrusions 61 of the outer ring 11, respectively.

In this embodiment, the protrusions 61 of the outer ring 11 comprise five protrusions, and the protrusions 63 of the control retainer 16A comprise nine protrusions, so that the protrusions 61 are not equal in number to the protrusions 63. The protrusions 61 are substantially of the same size as the protrusions 63.

By providing the five protrusions 61 on the outer ring 11 and the nine protrusions 63 on the control retainer 16A, whenever the control retainer 16A abuts the open end surface of the outer ring 11 as illustrated in FIG. 8, an adjacent pair of the protrusions 63, which are denoted, by way of example, by the numerals "63a" and "63b" in FIG. 8, engage, respectively, one and the opposite circumferential end surfaces of an adjacent pair of the protrusions 61, which are denoted, by way of example, by the numerals "61a" and "61b". This engagement prevents the control retainer 16A from rotating relative to the outer ring 11, so that the control retainer 16A and the outer ring 11 never circumferentially move relative to each other.

The control retainer 16A shown has the recesses 62, by which the respective protrusions 63 are defined. Instead, the protrusions 63 may be formed to protrude axially from the surface of the flange 24 opposed to the outer ring 11, while omitting the recesses 62.

Figure 11:
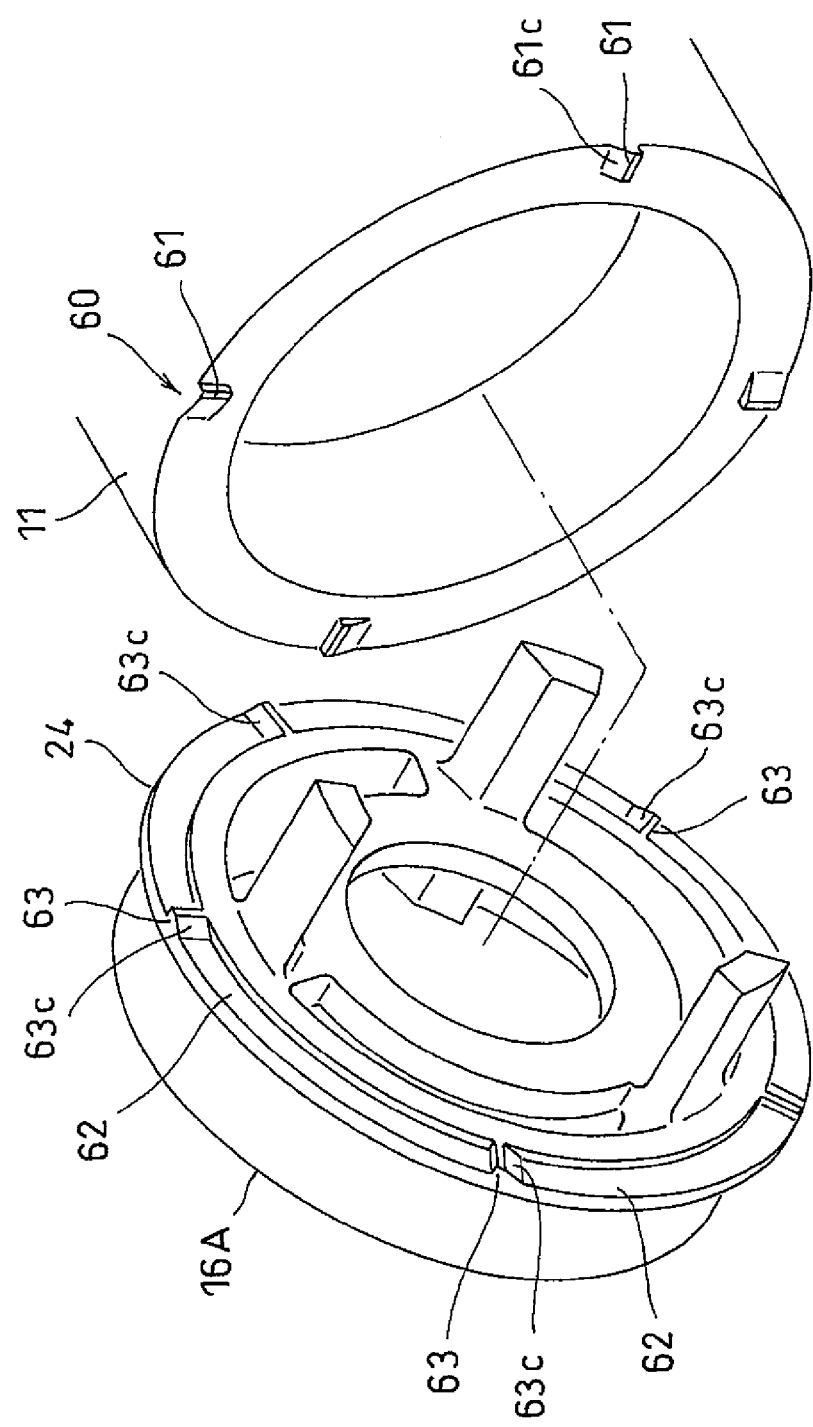
FIG. 11 is an exploded perspective view of a different anti-rotation means.

Also, the number of the protrusions 61 of the outer ring 11 is not limited to the number illustrated in FIG. 8, and the number of the protrusions 63 of the control retainer 16A is also not limited to the number illustrated in FIG. 8. For example, as illustrated in FIG. 11, the outer ring 11 may have four protrusions 61 circumferentially equidistantly spaced apart from each other, and the control retainer 16A may have five protrusions 63 circumferentially equidistantly spaced apart from each other.

The outer ring 11 is made of high carbon steel S45C, SCr, and heat treatment is performed to the cylindrical surface 12 and the protrusions 61 so as to increase the hardness thereof. The control retainer 16A is made of SMF, and heat treatment is performed to the protrusions 63 so as to increase the hardness thereof. The hardness of the protrusions 61 and 63 is predetermined to be HV 600 or over.

As for the control retainer 16A, heat treatment is performed to only the protrusions 63. The reason is because if heat treatment is performed to the whole of the control retainer 16A, the toughness of the control retainer 16A decreases, so that when the rollers 15 are pressed to move to their neutral position, a stress concentrates on the root of each pillar 25 and thus a crack is likely to occur in the root.

As the heat treatment performed to the outer ring 11, carburizing and quenching, laser quenching or high frequency quenching can be used. As the heat treatment performed to the control retainer 16A, laser quenching or high frequency quenching can be used. By use of laser quenching, it is possible to reduce the deformation of members caused by quenching. For this reason, laser quenching is especially effective for retainers, since the deformation of retainers causes a problem.

The rotation transmission device of the embodiment is configured as described above. FIG. 2(b) illustrates the state in which the rollers 15 of the two-way clutch 10 are engaged. With the two-way clutch 10 engaged, when the electromagnetic coil 53a of the electromagnetic clutch 50 is energized, an attraction force is applied to the armature 51, so that the armature 51 axially moves until the armature 51 abuts the rotor 52.

Since the armature 51 is fixedly coupled to the control retainer 16A, when the armature 51 axially moves toward the rotor 52, the control retainer 16A moves in the direction in which the flange 24 of the control retainer 16A approaches the flange 28 of the rotary retainer 16B.

At this time, the balls 43 roll to move from the position illustrated in FIG. 6(b) to the position illustrated in FIG. 6(a), specifically, to the deepest portions of the respective opposed pairs of cam grooves 41 and 42, so that the control retainer 16A and the rotary retainer 16B rotate relative to each other in the direction in which the circumferential widths of the respective pockets 31 decrease, and thus each opposed pairs of rollers 15 illustrated in FIG. 2(b) are pushed by the pillar 25 of the control retainer 16A and by the pillar 29 of the rotary retainer 16B so as to approach each other.

As a result thereof, as illustrated in FIG. 2(a), the rollers 15 move to the neutral position in which the pairs of rollers 15 are not engaged with the cylindrical surface 12 and the respective cam surfaces 14, thereby disengaging the two-way clutch 10.

When the control retainer 16A axially moves toward the rotor 52, the protrusions 61 and 63 are disengaged from each other as illustrated in FIG. 9, so that the control retainer 16A becomes rotatable relative to the outer ring 11.

With the two-way clutch 10 disengaged, when torque is applied to the input shaft 1 so as to rotate the inner ring 13 in one direction, since the anti-rotation pieces 47 of the holding plate 46 push either the pillars 25 of the control retainer 16A or the pillars 29 of the rotary retainer 16B, the control retainer 16A and the rotary retainer 16B rotate together with the inner ring 13. At this time, since the rollers 15 are at the neutral position in which the rollers 15 are disengaged, the rotation of the inner ring 13 is not transmitted to the outer ring 11, so that the inner ring 13 rotates freely/alone.

When the control retainer 16A and the rotary retainer 16B rotate relative to each other in the direction in which the circumferential widths of the respective pockets 31 decrease, the pillars 25 of the control retainer 16A abut the respective first side edges of the anti-rotation pieces 47 of the holding plate 46, and the pillars 29 of the rotary retainer 16B abut the respective second side edges of the anti-rotation pieces 47, thereby restricting the relative rotation between the retainers 16A and 16B.

Therefore, the elastic members 21 are not contracted more than necessary, so that the breakage of the elastic members 21 due to fatigue can be prevented even if the elastic members 21 are repeatedly contracted and expanded.

With the inner ring 13 rotating freely/alone, when the electromagnetic coil 53a is de-energized, the attraction force applied to the armature 51 disappears, and thus the armature 51 is kept rotatable. As a result thereof, due to the pressing force of the elastic members 21, the control retainer 16A and the rotary retainer 16B rotate relative to each other in the direction in which the circumferential widths of the respective pockets 31 increase, thereby moving the rollers 15 to the standby position at which the opposed pairs of rollers 15 engage with the cylindrical surface 12 and the respective cam surfaces 14 as illustrated in FIG. 2(b). In this state, torque in one direction is transmitted between the inner ring 13 and the outer ring 11 through one of each opposed pair of rollers 15.

In this state, when the input shaft 1 is stopped and then rotated in the opposite direction, the rotation of the inner ring 13 is transmitted to the outer ring 11 through the other of each opposed pair of rollers 15.

As described above, when the electromagnetic coil 53a is de-energized, the control retainer 16A and the rotary retainer 16B rotate relative to each other in the direction in which the circumferential widths of the respective pockets 31 increase, thereby moving the rollers 15 to the standby position at which the opposed pairs of rollers 15 can instantly become wedged between the cylindrical surface 12 and the respective cam surfaces 14. Therefore, the rollers 15 scarcely move in the rotational direction when the two-way clutch engages, and the rotation of the inner ring 13 can be instantly transmitted to the outer ring 11.

Since torque is transmitted from the inner ring 13 to the outer ring 11 through rollers 15 that are equal in number to the cam surfaces 14, it is possible to transmit large torque from the inner ring 13 to the outer ring 11.

When the control retainer 16A and the rotary retainer 16B rotate relative to each other in the direction in which the circumferential widths of the respective pockets 31 increase, the control retainer 16A moves toward the open end surface of the outer ring 11 until the flange 24 of the control retainer 16A abuts the open end surface of the outer ring 11 as illustrated in FIG. 8. As a result thereof, two of the protrusions 63 of the control retainer 16A abut two of the protrusions 61 of the outer ring 11, respectively, thereby rotationally fixing the control retainer 16A to the outer ring 11.

Due to this, even if a disturbance such as a vibration is applied to the rotation transmission device, the control retainer 16A never rotates relative to the outer ring 11. Therefore, the pairs of rollers 15 are kept in engagement with the cylindrical surface 12 and the respective cam surfaces 14, and never move to their neutral position. As a result thereof, torque can be reliably transmitted between the inner ring 13 and the outer ring 11 through the rollers 15, thus enabling the rotation transmission device to operate with high reliability.

Figure 6:
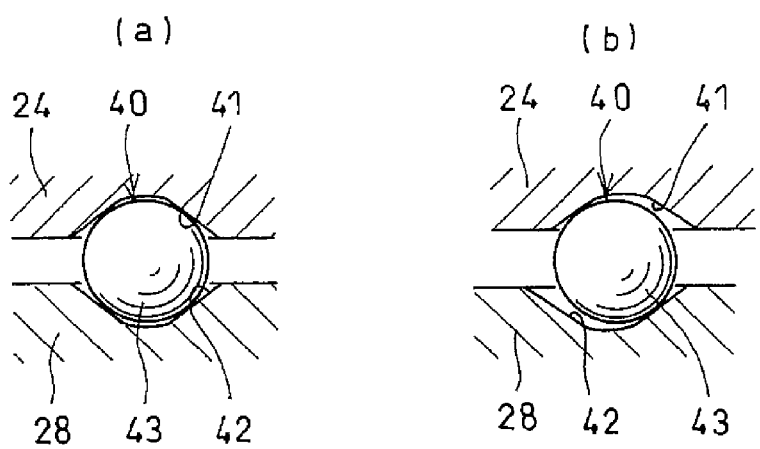
FIG. 6(a) is a sectional view taken along line VI-VI of FIG. 5.
FIG. 6(b) is a sectional view illustrating an operational state.

When the control retainer 16A and the rotary retainer 16B rotate relative to each other in the direction in which the circumferential widths of the respective pockets 31 increase, the balls 43 roll to move toward the shallow portions of the respective opposed pairs of cam grooves 41 and 42 until the balls 43 reach the position illustrated in FIG. 6(*b*).

In the embodiment illustrated in FIG. 1, the control retainer 16A and the rotary retainer 16B are assembled together such that the pillars 25 and 29 are arranged between the outer ring 11 and the inner ring 13, and such that the flanges 24 and 28, axially opposed to each other, are arranged between the outer ring 11 and the armature 51. Therefore, the outer ring 11 is short in the axial direction and lightweight.

In the anti-rotation arrangement 60 illustrated in FIG. 8, if the inclination angle α of the engaging surfaces of the protrusions 61 and 63 relative to the open end surface of the outer ring 11 is larger than the inclination angle of the cam grooves 41, 42 of the torque cam 40 illustrated in FIGS. 6(*a*) and 6(*b*), the two-way clutch 10 may not be able to disengage.

Figure 12:
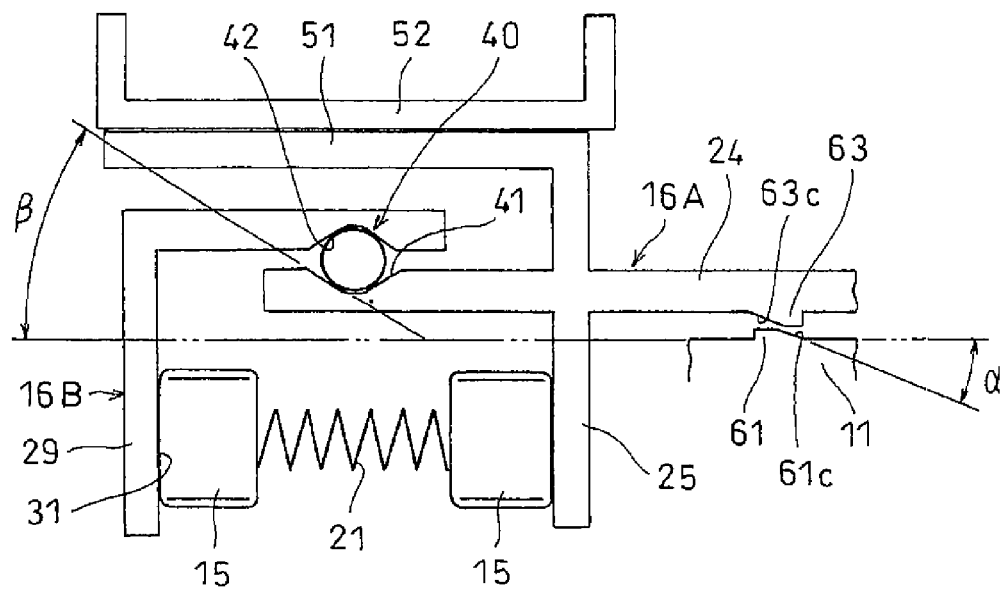
FIG. 12 is a schematic view illustrating the state in which a member is not rotationally fixed by the anti-rotation means illustrated in FIG. 11.
Figure 13:
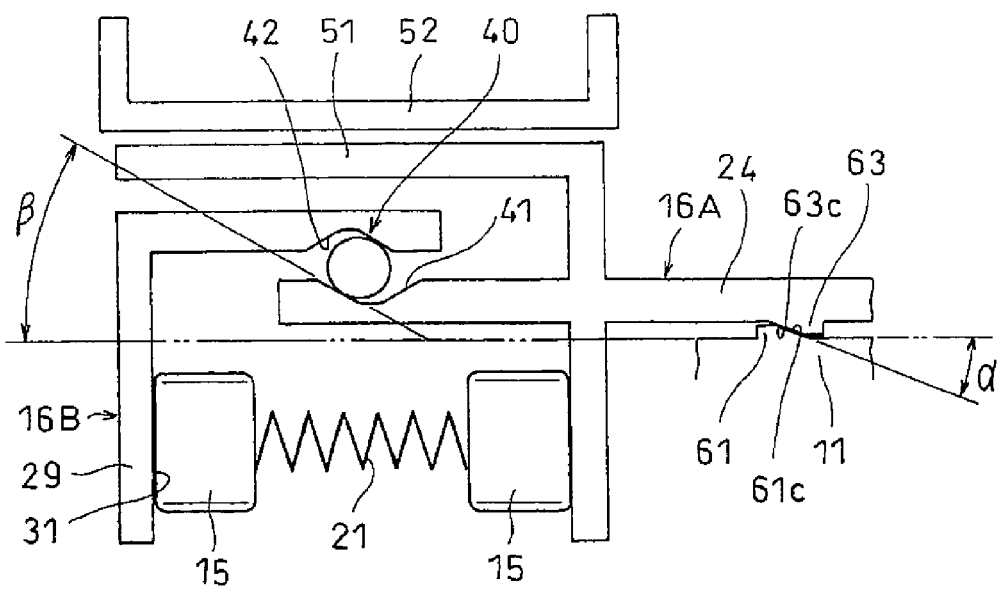
FIG. 13 is a schematic view illustrating the state in which a member is rotationally fixed by the anti-rotation means illustrated in FIG. 11.

Namely, as illustrated in the schematic views of FIGS. 12 and 13, with torque being transmitted through the rollers 15 kept in contact with the respective pillars 29 of the rotary retainer 16B, when the electromagnetic coil 53*a* of the electromagnet 53 is energized, since the rotary retainer 16B is in engagement with the rollers 15 through which torque is being transmitted, and thus cannot rotate in the direction in which the circumferential widths of the respective pockets 31 decrease, the control retainer 16A is subjected to a force that tends to move the control retainer 16A toward the rotor 52 while rotating in the direction in which the circumferential widths of the respective pockets 31 decrease, due to the relationship with the torque cam 40.

At this time, if the inclination angle α of the engaging surfaces of the protrusions 61 and 63 relative to the open end surface of the outer ring 11 is larger than the inclination angle β of the cam grooves 41, 42 of the torque cam 40 relative to the open end surface of the outer ring 11 (α>β), such engaging surfaces may prevent the rotation of the control retainer 16A, so that the rollers 15 may not be able to disengage.

In order to avoid such a situation, in FIGS. 11 to 13, each protrusion 61 has a tapered end surface 61*c* (first tapered end surface 61*c*) on its rear side in the forward direction in which the outer ring 11 rotates, and each protrusion 63 has also a tapered end surface 63*c* (second tapered end surface 63*c*) arranged to be opposed to (formed to engage with) one of the tapered end surfaces 61*c*, so that the inclination angle α of the tapered surfaces 61*c* and 63*c* relative to the end surface of the outer ring 11 is smaller than the inclination angle β of the cam grooves 41, 42 of the torque cam 40 relative to the end surface of the outer ring 11.

By forming the tapered end surfaces 61*c* and 63*c* such that the inclination angle α of the tapered surfaces 61*c* and 63*c* is smaller than the inclination angle β of the cam grooves 41, 42 as described above, the rotation of the control retainer 16A is never prevented due to the difference between the inclination angles α and β. As a result thereof, when the electromagnetic coil 53*a* of the electromagnet 53 is energized, the control retainer 16A axially moves while rotating in the direction in which the circumferential widths of the respective pockets 31 decrease until the control retainer 16A reaches the position illustrated in FIG. 12 from the position illustrated in FIG. 13. Due to this, it is possible to reliably disengage the two-way clutch 10.

The "forward direction in which the outer ring 11 rotates" described above means the clockwise direction when the open end surface of the outer ring 11 is seen from the front.

While torque is being transmitted through the rollers 15 kept in contact with the respective pillars 25 of the control retainer 16A, since the rollers 15 kept in contact with the respective pillars 29 of the rotary retainer 16B are disengaged, the rotary retainer 16B can rotate freely in the direction in which the circumferential widths of the respective pockets 31 decrease. For this reason, even if the inclination angle α is larger than the inclination angle β, when the electromagnetic coil 53*a* of the electromagnet 53 is energized, the control retainer 16A can axially move while rotating. Therefore, as illustrated in FIGS. 11 to 13, the remaining end surfaces of the protrusions 61 and 63 may extend orthogonal to the open end surface of the outer ring 11.

When the electromagnetic coil 53*a* of the electromagnet 53 is de-energized, the protrusions 63 of the anti-rotation arrangement 60, formed on the control retainer 16A, are rapidly returned toward the outer ring 11 due to the elastic force of the elastic members 21 so that two of the protrusions 63 collide hard against two of the protrusions 61 of the outer ring 11, respectively. If the protrusions 61 and 63 do not have sufficient strength, the protrusions 61 and 63 tend to be damaged. However, in the embodiment of the present invention, heat treatment is performed to the protrusions 61 of the outer ring 11 and to the protrusions 63 of the control retainer 16A so that the protrusions 61 and 63 have sufficient strength. Therefore, the protrusions 61 and 63 are never damaged.

Figure 14:
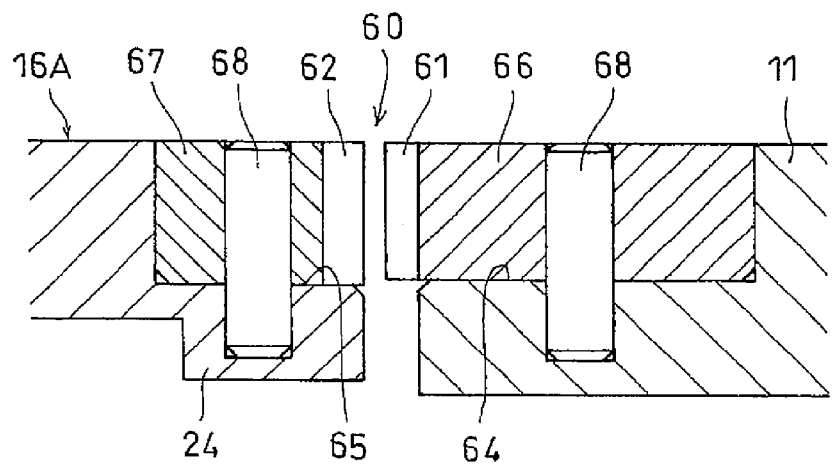
FIG. 14 is a sectional view illustrating protrusions of an anti-rotation means and rings on which the protrusions are formed.

In the embodiment illustrated in FIGS. 7 to 9, the protrusions 61 and the recesses 62, constituting the anti-rotation arrangement 60, are formed directly on the open end surface of the outer ring 11 and in the flange 24 of the control retainer 16A, respectively. However, as illustrated in FIG. 14, the anti-rotation arrangement 60 may be provided by forming small diameter cylindrical surfaces 64 and 65, respectively, in the outer periphery of the open end portion of the outer ring 11 and in the outer periphery of the flange 24 of the control retainer 16A, fitting rings 66 and 67 on the small diameter cylindrical surfaces 64 and 65, respectively, inserting pins 68 through the respective rings into the small diameter cylindrical surfaces such that the rings 66 and 67 are fixed thereon, forming protrusions 61 on one of the opposed surfaces of the rings 66 and 67, and forming recesses 62 in the other of the opposed surfaces of the rings 66 and 67.

Figure 2:
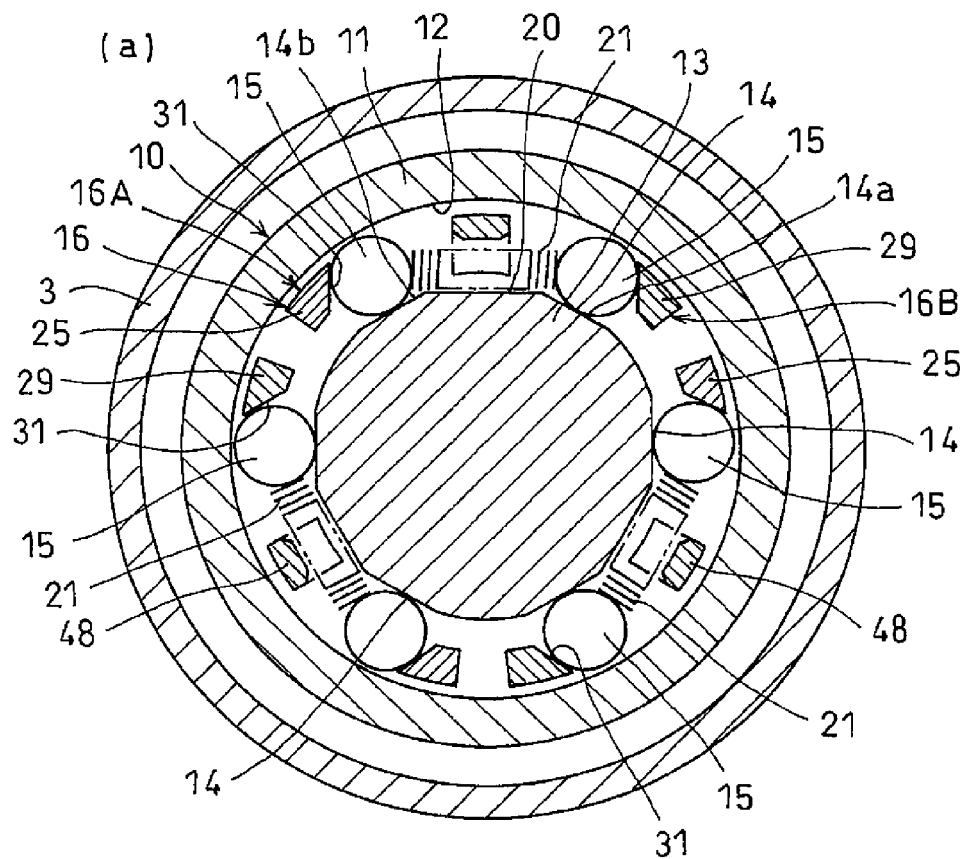
FIG. 2(a) is a sectional view taken along line II-II of FIG. 1.
FIG. 2(b) is a sectional view illustrating the state in which rollers are engaged.
Figure 2:
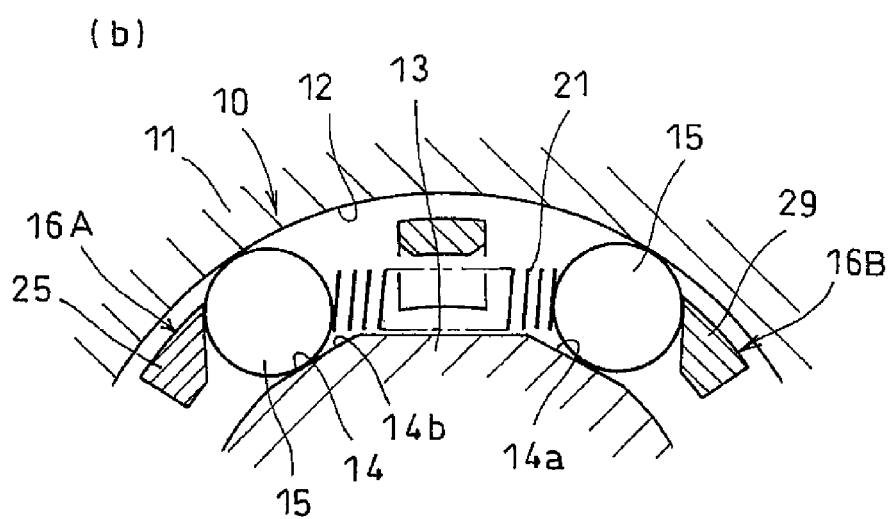

In the embodiment illustrated in FIGS. 1 to 3, the two way clutch 10 comprises a roller-type clutch in which the control retainer 16A moves in the axial direction by de-energizing the electromagnet 53. Thus, the control retainer 16A and the rotary retainer 16B rotate relative to each other, so that the rollers 15 (engaging elements) engage with the inner periphery of the outer ring 11 and the outer periphery of the inner ring 13. However, the two-way clutch 10 is not limited to such a roller-type clutch.

Figure 15:
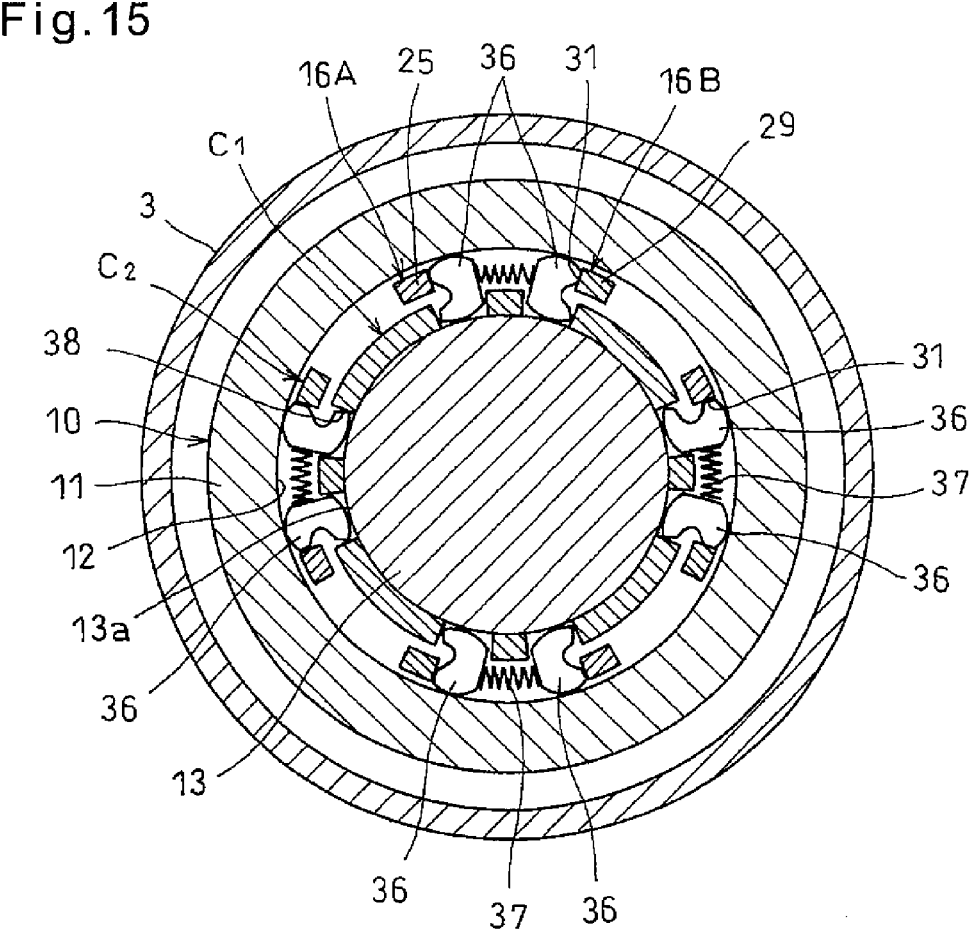
FIG. 15 is a sectional view of a different two-way clutch.

For example, as illustrated in FIG. 15, the two-way clutch 10 may comprise a sprag-type clutch in which a retainer $C_1$ and a retainer assembly $C_2$ different in diameter from each other are arranged radially inwardly of the retainer assembly $C_2$ and radially outwardly of the retainer $C_1$, respectively, the retainer assembly $C_2$, having a larger diameter and arranged radially outwardly of the retainer $C_1$, is constituted by the control retainer 16A and the rotary retainer 16B as in the embodiment illustrated in FIGS. 1 to 3, a plurality of pairs of sprags 36 (engaging elements) are received in the pockets 31, defined between the pillars 25 of the control retainer 16A and the respective pillars 29 of the rotary retainer 16B with elastic members 37 arranged between the respective pairs of sprags 36, and the inner end portions of the sprags 36 are inserted in respective pockets 38 formed in the retainer $C_1$ such that the sprags 36 are pivotable about their respective inner end portions.

In the two-way clutch 10 comprising such a sprag-type clutch as described above, when the electromagnet 53 of the electromagnetic clutch 50 is de-energized, each pair of sprags 36 pivot due to the pressing force of the corresponding elastic member 37 in the direction in which the outer end portions of the sprags 36 move away from each other, thereby engaging the sprags 36 with the inner peripheral cylindrical surface 12 of the outer ring 11 and the outer peripheral cylindrical surface 13a of the inner ring 13. Also, when the control retainer 16A axially moves by energizing the electromagnet 53, and thus the control retainer 16A and the rotary retainer 16B rotate relative to each other, the outer end portions of each pair of sprags 36 are pressed by the corresponding pillars 25 and 29, respectively, so that each pair of sprags 36 pivot in the direction in which the outer end portions of the sprags 36 approach each other, thereby disengaging the sprags 36 relative to the inner peripheral cylindrical surface 12 of the outer ring 11 and the outer peripheral cylindrical surface 13a of the inner ring 13.

DESCRIPTION OF REFERENCE NUMERALS

1: input shaft
2: output shaft
10: two-way clutch
11: outer ring
12: cylindrical surface
13: inner ring
14: cam surface
15: roller (engaging element)
16A: control retainer
16B: rotary retainer
21, 37: elastic member
24, 28: flange
25, 29: pillar
31: pocket
36: sprag (engaging element)
40 torque cam (motion converting mechanism)
50: electromagnetic clutch
51: armature
52: rotor
53: electromagnet
60: anti-rotation arrangement
61, 63: protrusion
66, 67: ring

The invention claimed is:

1. A rotation transmission device comprising:
an input shaft;
an output shaft arranged coaxially with the input shaft;
a two-way clutch configured to selectively perform and stop transmission of torque between the input shaft and the output shaft; and
an electromagnetic clutch configured to selectively engage and disengage the two-way clutch,
wherein the two-way clutch comprises:
an outer ring provided at an end portion of the output shaft;
an inner ring provided at an end portion of the input shaft;
a control retainer having first pillars; and
a rotary retainer having second pillars;
wherein the first pillars and the second pillars are arranged between an inner periphery of the outer ring and an outer periphery of the inner ring such that the first pillars circumferentially alternate with the second pillars;
wherein pockets are defined between adjacent ones of the first and second pillars,
wherein the two-way clutch further comprises:
a plurality of pairs of engaging elements, each pair of the engaging elements being received in a respective one of the pockets so as to be engageable with the inner periphery of the outer ring and the outer periphery of the inner ring; and
elastic members each biasing a respective pair of the engaging elements in a direction away from each other,
wherein the electromagnetic clutch comprises:
an armature coupled to the control retainer;
a rotor axially opposed to the armature; and
an electromagnet axially opposed to the rotor, and configured to attract the armature such that the armature abuts the rotor when the electromagnet is energized,
wherein the two-way clutch and the electromagnetic clutch are configured such that when the electromagnet is energized, the control retainer, together with the armature, is moved in an axial direction toward the rotor, and
wherein the rotation transmission device further comprises a motion converting mechanism configured such that when the control retainer is moved in the axial direction, the motion converting mechanism converts the axial movement of the control retainer to a relative rotary motion between the control retainer and the rotary retainer in a direction in which circumferential widths of the respective pockets decrease, thereby disengaging the pairs of engaging elements, wherein the rotation transmission device further comprises an anti-rotation arrangement between the outer ring and the control retainer and configured to prevent the outer ring and the control retainer from rotating relative to each other when the two-way clutch is engaged due to de-energizing of the electromagnet,
wherein the anti-rotation arrangement comprises:
a plurality of first protrusions formed on a surface of the outer ring so as to be circumferentially equidistantly spaced apart from each other; and
a plurality of second protrusions formed on a surface of the control retainer axially opposed to the surface of the outer ring, the second protrusions being arranged so as to be circumferentially equidistantly spaced apart from each other,
wherein a quantity of the first protrusions of the outer ring is different from a quantity of the second protrusions of the control retainer such that at least one of the second protrusions can circumferentially engage with at least one of the first protrusions, and
wherein the first protrusions of the outer ring and the second protrusions of the control retainer are heat-treated.

2. The rotation transmission device according to claim 1, wherein the first protrusions and the second protrusions are laser-quenched or high-frequency-quenched.

3. The rotation transmission device according to claim 2, wherein the first protrusions are formed directly on the outer ring, and the second protrusions are formed directly on the control retainer.

4. The rotation transmission device according to claim 2, wherein the outer ring includes a ring fitted and fixed on the outer ring, and the first protrusions are formed on the ring of the outer ring, and wherein the control retainer includes a ring fitted and fixed on the control retainer, and the second protrusions are formed on the ring of the control retainer.

5. The rotation transmission device according to claim 2, wherein the motion converting mechanism comprises a torque cam including:
cam grooves each formed in respective opposed surfaces of a flange of the control retainer and a flange of the rotary retainer such that each of the cam grooves is deepest at a circumferential center of the cam groove, and such that a depth of each of the cam grooves gradually decreases toward respective circumferential ends of the cam groove; and
a ball received between the cam grooves,
wherein the torque cam is configured such that when the control retainer axially moves, the torque cam rotates the control retainer and the rotary retainer relative to each other in a direction in which the circumferential widths of the respective pockets decrease,
wherein each of the first protrusions of the outer ring has a first tapered end surface on a rear side of the first protrusion in a forward direction in which the outer ring rotates, and each of the second protrusions of the control retainer has a second tapered end surface formed to engage with one of the first tapered end surfaces, and
wherein an inclination angle of each of the first and second tapered surfaces relative to an end surface of the outer ring is set to be smaller than an inclination angle of each of the cam grooves of the torque cam relative to the end surface of the outer ring.

6. The rotation transmission device according to claim 1, wherein the first protrusions are formed directly on the outer ring, and the second protrusions are formed directly on the control retainer.

7. The rotation transmission device according to claim 6, wherein the motion converting mechanism comprises a torque cam including:
cam grooves each formed in respective opposed surfaces of a flange of the control retainer and a flange of the rotary retainer such that each of the cam grooves is deepest at a circumferential center of the cam groove, and such that a depth of each of the cam grooves gradually decreases toward respective circumferential ends of the cam groove; and
a ball received between the cam grooves,
wherein the torque cam is configured such that when the control retainer axially moves, the torque cam rotates the control retainer and the rotary retainer relative to each other in a direction in which the circumferential widths of the respective pockets decrease,
wherein each of the first protrusions of the outer ring has a first tapered end surface on a rear side of the first protrusion in a forward direction in which the outer ring rotates, and each of the second protrusions of the control retainer has a second tapered end surface formed to engage with one of the first tapered end surfaces, and
wherein an inclination angle of each of the first and second tapered surfaces relative to an end surface of the outer ring is set to be smaller than an inclination angle of each of the cam grooves of the torque cam relative to the end surface of the outer ring.

8. The rotation transmission device according to claim 1, wherein the outer ring includes a ring fitted and fixed on the outer ring, and the first protrusions are formed on the ring of the outer ring, and wherein the control retainer includes a ring fitted and fixed on the control retainer, and the second protrusions are formed on the ring of the control retainer.

9. The rotation transmission device according to claim 8, wherein the motion converting mechanism comprises a torque cam including:
cam grooves each formed in respective opposed surfaces of a flange of the control retainer and a flange of the rotary retainer such that each of the cam grooves is deepest at a circumferential center of the cam groove, and such that a depth of each of the cam grooves gradually decreases toward respective circumferential ends of the cam groove; and
a ball received between the cam grooves,
wherein the torque cam is configured such that when the control retainer axially moves, the torque cam rotates the control retainer and the rotary retainer relative to each other in a direction in which the circumferential widths of the respective pockets decrease,
wherein each of the first protrusions of the outer ring has a first tapered end surface on a rear side of the first protrusion in a forward direction in which the outer ring rotates, and each of the second protrusions of the control retainer has a second tapered end surface formed to engage with one of the first tapered end surfaces, and
wherein an inclination angle of each of the first and second tapered surfaces relative to an end surface of the outer ring is set to be smaller than an inclination angle of each of the cam grooves of the torque cam relative to the end surface of the outer ring.

10. The rotation transmission device according to claim 1, wherein the motion converting mechanism comprises a torque cam including:
- cam grooves each formed in respective opposed surfaces of a flange of the control retainer and a flange of the rotary retainer such that each of the cam grooves is deepest at a circumferential center of the cam groove, and such that a depth of each of the cam grooves gradually decreases toward respective circumferential ends of the cam groove; and
- a ball received between the cam grooves,
- wherein the torque cam is configured such that when the control retainer axially moves, the torque cam rotates the control retainer and the rotary retainer relative to each other in a direction in which the circumferential widths of the respective pockets decrease,
- wherein each of the first protrusions of the outer ring has a first tapered end surface on a rear side of the first protrusion in a forward direction in which the outer ring rotates, and each of the second protrusions of the control retainer has a second tapered end surface formed to engage with one of the first tapered end surfaces, and
- wherein an inclination angle of each of the first and second tapered surfaces relative to an end surface of the outer ring is set to be smaller than an inclination angle of each of the cam grooves of the torque cam relative to the end surface of the outer ring.

\* \* \* \* \*